(No Model.)

C. MUNSON, Dec'd.
F A. MUNSON, Executrix.
GRINDING MILL.

No. 591,988.  Patented Oct. 19, 1897.

WITNESSES
Rich. A. George
E. W. Jones

INVENTOR
COUNCIL MUNSON.
By Risley, Robinson & Love
ATTORNEYS

UNITED STATES PATENT OFFICE.

COUNTCIL MUNSON, OF UTICA, NEW YORK; FLORENCE A. MUNSON, EXECUTRIX OF SAID COUNTCIL MUNSON, DECEASED, ASSIGNOR TO MUNSON BROS., OF SAME PLACE.

GRINDING-MILL.

SPECIFICATION forming part of Letters Patent No. 591,988, dated October 19, 1897.

Application filed October 15, 1896. Serial No. 608,930. (No model.)

*To all whom it may concern:*

Be it known that I, COUNTCIL MUNSON, of Utica, in the county of Oneida and State of New York, have invented certain new and useful Improvements in Grinding-Mills; and I do hereby declare that the following is a full, clear, and exact description of the invention, which will enable others skilled in the art to which it appertains to make and use the same, reference being had to the accompanying drawings, and to the figures of reference marked thereon, which form part of this specification.

Figure 1:
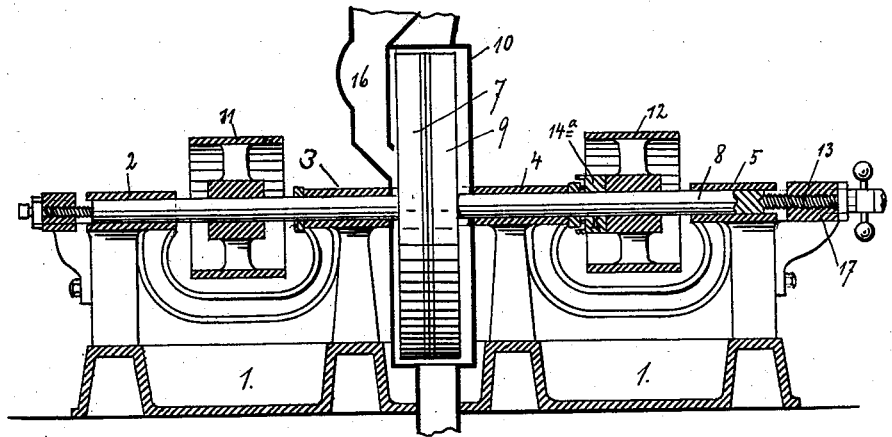
Figure 4:
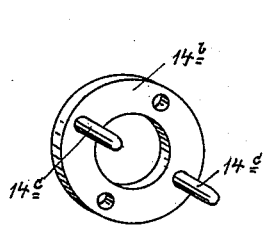
Figure 3:
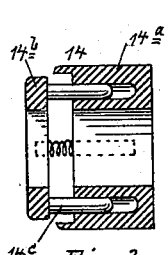
Figure 5:
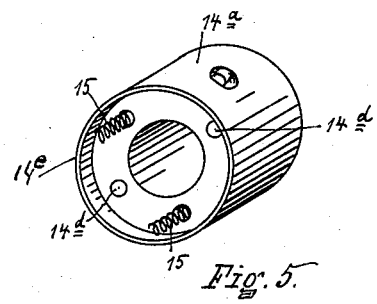
Figure 2:
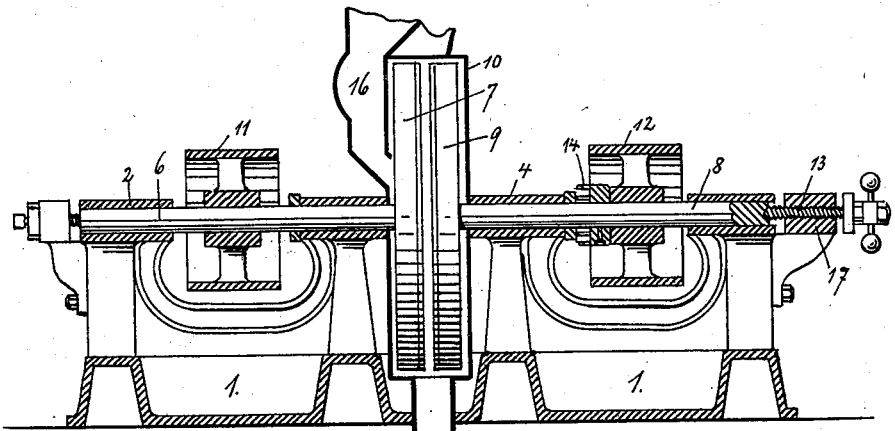

In the drawings, Figure 1 shows a longitudinal section of my grinding-mill with the grinding-disks close together. Fig. 2 shows the same with the grinding-disks separated. Fig. 3 shows a longitudinal section of a spring-collar employed in the construction. Fig. 4 shows one of the parts of the collar in perspective. Fig. 5 shows the other part in perspective.

Referring to the reference-figures in a more particular description of the device, 1 indicates the grinding-mill base, which carries four shaft-bearings 2, 3, 4, and 5. In the bearings 2 and 3 is mounted the shaft 6, carrying the grinding-disk 7. In the bearings 4 and 5 is mounted the shaft 8, carrying the grinding-disk 9. The grinding-disks 7 and 9 are contained in the casing 10. The disk 7 is adapted to be driven in one direction by a belt on the band-pulley 11. The disk 9 is adapted to be driven in the opposite direction by a belt on the band-pulley 12. As shown in the drawings, the shaft 6 with its disk 7 is not capable of automatic endwise movement. The disk 9 with its shaft 8 is adjustable toward the disk 7 by means of the setting-up screw 13, engaging in a nut 17 on the end of the frame and acting against the end of the shaft 8. By operating this screw the disk 9 can be brought more or less closely to the disk 7 and thereby determine the fineness with which the mill will grind. On the shaft 8 is secured the part $14^a$ of the expansible collar 14. The other part, $14^b$, of this collar is loosely connected with the part $14^a$ by pins $14^c$, entering holes $14^d$. The part $14^a$ is also provided with an overhanging edge $14^e$, which assists in maintaining the part $14^b$ in proper relation to the part $14^a$. Between the parts $14^a$ and $14^b$ are introduced springs 15 15, which are compressed so as to force the part $14^b$ outwardly and away from the part $14^a$. The springs 15 are received partially in cavities or chambers in the part $14^a$ separate and independent from holes $14^d$, which receive the sliding pins, and partially in corresponding cavities or chambers in the part $14^b$. The collar part $14^a$ is secured on the shaft 8 so that the part $14^b$ will press against the end of the shaft-bearing 4.

The grain is fed to the disks through a chute 16, which delivers the grain adjacent to the center of the disk, where it feeds through between the spokes of the disk at the center and is discharged after being ground between the peripheries of the disks. When the disk 9 is set up toward the disk 7, by operating the setting-up screw 13, it is done against the pressure of the springs 15 in the collar. Should the feed of grain run light or entirely fail, the tendency of the disk 9 to run against the disk 7, by reason of the side throw of the belt or otherwise, is obviated by the holding-off action of the collar 14, pressing against the outer end of the box 4. In case the disks should run in contact without any grain being fed, they would injure one another.

The mill, as shown, is a double grinding-mill, but it is evident that the disk 7 could be held stationary instead of being driven in the opposite direction from the disk 9, in which case the mill would be a single mill, but the operation of the holding-off collar 14 would be the same.

What I claim as new, and desire to secure by Letters Patent, is—

The combination in a grinding-mill of a rotary grinding-disk, an opposing plate or disk, a shaft carrying the rotary disk, bearings therefor, a forcing-up screw mounted in a fixed support and acting on the end of the shaft and a holding-off collar consisting of part $14^a$ secured on the shaft and having pin-holes $14^d$ and partial separate spring-chambers and part $14^b$ having pins $14^c$ and partial spring-chambers and springs within the spring-chambers, the part $14^b$ acting against the end of the shaft-bearing, substantially as set forth.

In witness whereof I have affixed my signature in presence of two witnesses.

COUNTCIL MUNSON.

Witnesses:
 FRED GIBSON,
 A. E. COLE.